US012694321B2

(12) United States Patent
    Werbos

(10) Patent No.: US 12,694,321 B2
(45) Date of Patent: Jul. 28, 2026

(54) THERMAL QUANTUM ANNEALING

(71) Applicant: Paul J. Werbos, Arlington, VA (US)

(72) Inventor: Paul J. Werbos, Arlington, VA (US)

( * ) Notice: Subject to any disclaimer, the term of this patent is extended or adjusted under 35 U.S.C. 154(b) by 211 days.

(21) Appl. No.: 18/815,946

(22) Filed: Aug. 27, 2024

(65) Prior Publication Data

US 2024/0420006 A1       Dec. 19, 2024

Related U.S. Application Data

(63) Continuation of application No. 18/105,859, filed on Feb. 5, 2023, now Pat. No. 12,118,434.

(60) Provisional application No. 63/307,101, filed on Feb. 5, 2022.

(51) Int. Cl.
    *G06N 10/60*        (2022.01)
(52) U.S. Cl.
    CPC .................................... *G06N 10/60* (2022.01)
(58) Field of Classification Search
    CPC ...................................................... G06N 10/60
    See application file for complete search history.

(56) References Cited

U.S. PATENT DOCUMENTS

| 10,250,271 B2 * | 4/2019 | Goto | ....................... | G06N 10/20 |
| 10,262,276 B2 * | 4/2019 | Puri | ....................... | H03B 17/00 |

OTHER PUBLICATIONS

Shruti Puri et al. Quantum annealing with all-to-all connected nonlinear oscillators. Nature, Jun. 2017. (Year: 2017).*

Pontus Vikstål. Continuous-variable quantum annealing with superconducting circuits. Linköping University | Department of Physics, Chemistry and Biology Master thesis, 30 ECTS | Educational Program: Physics and Nanoscience Spring term 2018 | LITH-IFM-A-EX-18/3576-SE. (Year: 2018).*

N. G. Dickson et al. Thermally assisted quantum annealing of a 16-qubit problem. Nature Communications 2013 | 4:1903 | DOI: 10.1038/ncomms2920. (Year: 2013).*

Howard Barnum et al. Quantum Simulated Annealing. Mar. 28, 2008 / Classical and Quantum Information Theory, Santa Fe, NM. (Year: 2008).*

R. D. Somma et al. Quantum Approach to Classical Statistical Mechanics. Physical Review Letters 99, 030603 (2007). (Year: 2007).*

* cited by examiner

*Primary Examiner* — Collin X Beatty

(74) *Attorney, Agent, or Firm* — Outer Space IP

(57)                ABSTRACT

A method for solving continuous-variable quantum quadratic optimization problems is disclosed. Entangled qubits encoded with an Ising model problem are coupled to a heat reservoir. The Ising model problem expresses a continuous-variable quantum quadratic optimization problem. The entangled qubits are evolved by thermal annealing, resulting in optimized solutions to the continuous-variable quantum quadratic optimization problem. A temperature of the heat reservoir is varied on a schedule such that each evolution of the entangled qubits occurs while the heat reservoir is at a desired temperature.

4 Claims, 2 Drawing Sheets

$$H = \sum_{j=1}^{n} H_j^0 u_j + \sum_{j,k=1}^{n} H_{jk}^I u_j u_k$$

$$H = \sum_{j=1}^{n} H_j^0 u_j + \sum_{j,k=1}^{n} H_{jk}^I u_j u_k + \sum_{j,k=1}^{n,m} H_{jk}^E u_j x_k$$

401

402

503

507

509

505

501

THERMAL QUANTUM ANNEALING

CROSS-REFERENCE TO RELATED APPLICATIONS

The present application claims priority to U.S. patent application Ser. No. 18/105,859 and to U.S. provisional patent application 63/307,101.

TECHNICAL FIELD

This invention related broadly to stochastic simulations. More specifically this invention relates to specifications of stochastic simulations for true quantum quadratic optimizers (tQQO).

BACKGROUND OF THE INVENTION

Quantum computing has been studied since 1980 and harnesses the collective properties of quantum states. Attempts to practicalize these have continued since, with significant efforts in the last few years.

SUMMARY OF THE INVENTION

In a first aspect, a tQQO device for solving quantum quadratic optimization problems is disclosed. An ising type quantum array and a heat reservoir are provided.

In a second aspect, a system for solving mathematical problems is disclosed. A computer program product is configured to use one or more of the tQQO devices. A computer storage medium has a computer program code mechanism embedded in the computer storage medium and is configured to run the computer program product and cause the computer to solve the mathematical problems.

In a third aspect, a system for controlling a situation in the physical world with quantum mechanics is disclosed. A computer program product configured to use one or more of the tQQO devices of claim 1. The computer program product further configured to build a direct quantum controller simulating solutions to problem states by entangling the problem states with the heat reservoir. The computer program product further configured to select among the problem states of the situation for a desirable outcome to the situation.

Further aspects and embodiments are provided in the foregoing drawings, detailed description and claims.

BRIEF DESCRIPTION OF DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figures 1, 2, 3:
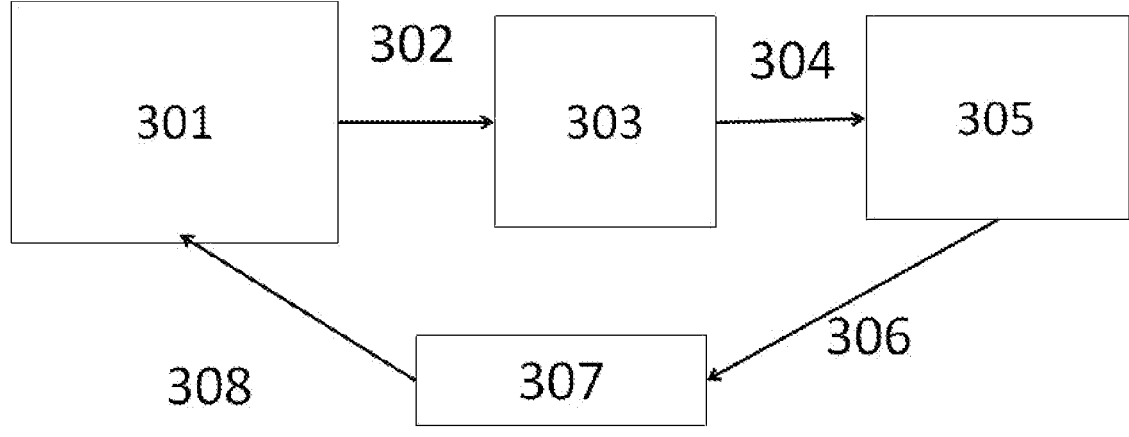
FIG. 1 is an equation.
FIG. 2 is an equation.
FIG. 3 is a block diagram showing quantum annealing.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "tQQO" is meant to refer to a true quantum quadratic optimizer.

As used herein, "tQuA" is meant to refer to true quantum annealing.

In previous papers, we have explained why we expect a new type of quantum hardware tQuA (true or thermal Quantum Annealing) to perform much better than the current leading quantum hardware for optimization, available from D-Wave, for a large and important set of optimization challenges. In many such challenges, tQuA promises to give us the full power of quantum superposition in solving optimization problems, a power which has never been achieved in general optimization programs written for the most popular quantum computing platforms, the Quantum Turing Machines.

To justify and guide the building of new tQuA hardware, the crucial first step is to run simulations on classical computers (e.g. using Matlab or Python) to look for specific examples of optimization challenges and quantum hardware designs where the advantages of tQuA would justify the next steps. This paper will specify how to construct such a simulation program, for the same specific class of optimization task (quantum quadratic optimization), tQQO, which lies at the heart of the D-Wave system. This class of task may sound narrow, but D-Wave has shown how it paves the way to an extremely broad range of follow-ons. tQuA can take that even further, once the core QQO capability is developed.

The core QQO task is the task of finding a vector $\underline{u}$ (made up of n flux qubits, $u_1$ to $u_n$) which minimizes $$H = \sum_{j=1}^{n} H_j^0 u_j + \sum_{j,k=1}^{n} H_{jk}^I u_j u_k,$$ [1]

3 for the pair of matrices $H^0$ and $H^I$ which are used to define the specific problem in this task. In the D-Wave system, there are elaborate interfaces which interpret a variety of user application types, but in the end, these create the matrices $H^0$ and $H^I$ which are sent to the kernel of the system to optimize, by finding an optimal (or good enough, near-optimal) value of the vector $\underline{u}$. tQQO can be used to address a broader set of tasks, but this paper focuses on this exact same task, to allow a comparison of performance. This choice of Hamiltonian matrix, H, shown in equation 1, is the well-known "Ising Hamiltonian."

The core of the current D-Wave system is a physical hardware system which they assume is governed by the usual Schrodinger equation for the Ising system:

$$\frac{du_j}{dt} = iH_j^0 u_j + ic\sum_k H_{jk}^I u_j u_k \qquad [2]$$

which can also be written as:

$$\frac{d\underline{u}}{dt} = iH\underline{u} \qquad [3]$$

They also offer simulators for this system, based on this equation, and many interfaces. Their hardware system includes a set of n "flux qubit" SQUIDs (a type of circuit element familiar in ordinary quantum computing), used to represent $u_1$ to $u_n$. Each number $u_j$ represents a SQUID representing an uncertain binary digit, equal to "1" with a probability amplitude of $u_j$. Note that a "flux qubit" here is a physical quantity, very distinct from the mathematical concept of qubit to be discussed below.

Their simulation program begins with some list or choice of N possible initial values for the vector $\underline{u}(t)$ at the time t=0, and some value for the coupling parameter c. Usually c is initially set to zero, and "annealed" (gradually tuned up) to one. The schedule for annealing, and menu of initial states, is determined experimentally for any problem, just like the choice of learning parameters in some machine learning systems. The DWave system itself offers recommended options. But in any case, N is not an exponential function of the number n of flux qubits.

Note that the quality of the final result here depends on the effectiveness of the search, and the diversity of the space actually searched, but is not impaired by decoherence as is the case with conventional Quantum Turing Machine programs. That is also true with tQQO, because the task here is not supposed to be one of finding a function of the initial state. Indeed, one measure of the quality of the system is the ability to find the minimum energy states independent of one's luck in choosing the initial state. Problems with such strong initial information are more suitable for tQQO, because of its greater independence, due to the larger search space.

tQQO is defined as the use of an Ising type quantum array, like that described in equation 1 (or generalized slightly), coupled to an (external) reservoir of heat, v(t). The idea is simply to use true annealing, which was widely used in materials science and engineering long before D-Wave arrived, in order to guide the core system $\underline{u}$ to a state of lower energy, by shedding energy to the reservoir. The combined system of reservoir and core will always be stochastic, and never give a perfect fixed minimum of energy for the reservoir, but if the parameters H of the core, and of the coupling and reservoir, are suitable, this kind of system should be able to search through a wide space of possible values for u, of dimensionality 2**N.

This should give great advantages for choices of H representing "needle in a haystack" problems, where traditional global kinds of numerical search usually do not perform well, because information like global slope does not pick out interesting local patterns.

Just as a perfect, noise-free Ising system can be described exactly by a Schrodinger equation (like (1)), an array coupled to a reservoir can be described exactly by a more complex type of equation from modern quantum statistical thermodynamics, a master equation. But for such systems, the usual wave function is not rich enough to describe the ensemble of possible states. Instead, we must study the dynamics of statistical ensembles defined by density matrices, defined by $$\rho(t) = \sum_{\underline{u}(t)} Pr(\underline{u}(t))\underline{u}(t)\underline{u}(t)^H \qquad [4]$$

It is possible to build a simulator for tDDO which is just as exact as the Schrodinger simulator offered by D-Wave for their DQQO, by using a master equation instead of a Schrodinger equation in the simulator.

$$\frac{d\rho}{dt} = iH\rho - i\rho H + c\rho^*(T), \qquad [5]$$

where c is a coupling coefficient and where $\rho^*(T)$ is the diagonal matrix made up of the elements $$\rho_{jj}^*( \ldots )$$

to be specified as part of the model. However, development and refinement of such a model is a task for the future. For now, it is simpler and more straightforward to program a simpler kind of initial model, which may well be powerful enough already for the essential initial round of simulations—the STOCHASTIC Schrodinger type of simulation model.

For the first round of mathematical analyses, we need to use the simplest possible model of the reservoir (implicit) and of the dynamics which can capture these effects. It is not necessary to minimize the actual run time on a sequential computer, either for DQQO or tQQO, because the key figures of merit are performance (quality, cost, time) predicted for the future, when the system is actually implemented on quantum hardware. The simplest reasonable model is to assume that the reservoir can be modeled as a rapidly changing complex scalar v(t), following Boltzmann statistics, but for generality a time-varying Temperature Tv. But in initial analysis and simulation runs, we may assume that Tv will be held constant, a parameter of the simulation.

The best way to develop a reliable stochastic simulation system for tQQO is to start from a foundation of true annealing, in which we start from an initial state(s) $\underline{u}(t=0)$, as in DQQO. But then at random times t, we perform a perturbation of $\underline{u}$ based on the assumed temperature Tv, and on a coupling constant C(t) different from the coupling c of equation 2. Instead of varying the coupling between u(t) and the interaction Hamiltonian, we assume a constant Hamiltonian H for u proper, but a variable degree of coupling between u and the reservoir.

In previous papers, we emphasized that the biggest immediate need for tQA technology is for solving "needle in a haystack" problems. Let us focus more precisely for now on M-valley nonmonotonic optimization problems. These are QO optimization problems in which the energy H as a function of u possesses M "valleys, M basins of attraction. In each basin of attraction, all points in the basin go down to a local minimum, the minimum for that basin. The space of allowed values for u forms M such basins, with H going to values larger than those in any basin at the far limits of the values of u under consideration. (For example, we can impose a limit on the length of u).

If we start from any single starting state u(t=0), and perturb u based on input/output to/from the reservoir, then the system will not find the state u of minimum energy, unless that state happens to be in the same basin as u(t=0).

As in ordinary thermal annealing in condensed matter physics, we must start with a higher temperature or coupling C(0), or from an initial state which is defined as a huge MIXTURE of possible initial states u(0), and then let the probability of excited states gradually leak away. The practical success of this kind of procedure, like the D-wave procedure, will depend on experimentation with various annealing schedules.

Compared with D-Wave, the only serious new feature is that the simulation should include a random number e(t), set to 1 or 0 at time intervals deltat, where deltat is a user-selected parameter of the simulation (to be scaled in proportion to a user-chosen time resolution).

For a concrete, minimum cost simulation, we might even choose a value of j at random at any such time of perturbation. But for initial work, it is easier to think in more abstract mathematical terms, where we plan to consider perturbations of the entire vector u. We need to fix a procedure which, depending on u and on global simulation parameters to be set by the user, determines $\Pr(\overline{u}^* | u(t))$, the probability that our program chooses the value $\overline{u}^*$ out of all the values available in the complex surface C". In essence, the problem of selecting (programming) this probability distribution for use in these early simulations is actually a problem in modeling, trying to find a probability distribution which reflects the actual physical systems being modeled well enough to make these initial simulation exercises worthwhile.

As Tv goes to zero, the obvious simulation approach here is to assume that u will be perturbed towards a value of minimum energy, simply by choosing a probability of u being changed to u* with follows a Boltzmann distribution, $\exp(-k(H-H^*)/C(t))$, normalized across possible values of u* such that the integral of $\Pr(u^* | u(t))$ over u*=1, with k a user-selected simulation parameter. But for larger coupling constants, this same perturbation procedure will lead to simulation paths outside of the initial basin.

A key feature of tQQO annealing is that having true qubits of Q=20 or Q=40 should result in 220 or 240 simulation paths going forward in parallel, when it is implemented on true quantum hardware. This suggests an ability to find the true global minimum for "needle in a haystack problem with M on the order of a million or a million million, far more than what the DWave system offers in such cases.

The key challenge here then is to build the first basic simulation package of this kind, be prepared to allow a thousand or a million simulation tracks in the stochastic simulation, and seeing how well it can do on simple Q=10 M=1000 types of sample choices of H.

The value of this kind of mathematical and simulation analysis depends on how well the models we use reflect the major, important properties of the physical QQO hardware. Until we actually build and test such physical hardware, we cannot be entirely certain of how good the models are in reflecting these properties, even when we implement the models on quantum simulation hardware.

The most solid and reliable foundation for all quantum information science and technology (QuIST) work today, which started and continues to fit all the vast empirical work on quantum Turing Machines (QTM), lies in the versions of quantum electrodynamics (QED) and quantum field theory in general. Straightforward mathematics shows that the thermodynamic equilibrium of any QED system, like the Ising system (equation 2) and a reservoir based on QED and the combination of the two, is given by the Grand canonical Boltzmann density operator, explained in the seminal fundamental text by Chaikin et al.

The probability distribution for possible states predicted by that density operator depends on the properties of the Hamiltonian H. In the analysis above, we focus on examples (minimization tasks) where that probability density is made up of distinct valleys (like "haystacks" when view from bottom to top, but like valleys when we picture less energy as down"). That is why the kind of stochastic simulation is also supposed to reflect the actual properties of this system.

We proposed that simulation tests of this kind should be followed up by simulations on a true quantum simulator, like the Albert machine of Cold Quanta or other such Bose-based simulators, which should allow replicating the sequential results with M=1000 quickly, and then generating tQQO versus DQQO comparisons for larger, more serious needle in a haystack problems. (Stochastic placement of basins of attraction should suffice.) And then, we could begin real hardware design leading to the more advanced stream of applications.

But the QuATh applications discussed in also suggest how the crude stochastic search suggested here (combining tQQO with the DWave kind of structure) could be enhanced by using insertion into RLADP structures, to allow minimization over the entire time interval, for example from t to 0 to 10 minutes. This could be used here to search for minima of H in a more foresighted way, even with the QQO task itself.

It is analogous to the classical neural network challenge I have called "Brain-Like Stochastic Search," but with a double quantum dimension, opening the door to true Quantum Artificial General Intelligence (QAGI).

A variety of preliminary experiments in fundamental quantum optics suggest that the assumptions about quantum measurement and entanglement made by David Deutsch, combined with conventional Copenhagen models of the macroscopic objects used in quantum measurement, may break down in new types of experiments, which may also lead to new quantum technologies. However, these turn out to be consistent with a modified form of Hard Core Einsteinian Realism, which leads to a new form for the entropy function which, like Deutsch's physics, is consistent with the models and designs discussed above. Possibilities for new types of design become more serious when we move on, past the kinds of tasks addressed by D-Wave, to Quantum AGI.

tQuA

Since 2011 the White House Smart Grid policy asks NSF to work for a "'4th generation intelligent grid' that would use intelligent system-wide optimization to allow up to 80% of electricity to come from renewable sources and 80% of cars to be pluggable electric vehicles (PEV) without compromising reliability, at minimum cost to the Nation (Werbos 2011, IEEE Computational Intelligence Magazine)." Just as Quantum Turing machines magnify the power of traditional Turing Machines, tQuA magnifies what the power of Reinforcement Learning and Approximate Dynamic Programming (RLADP) to handle fluctuating load curves and device conditions, especially in distribution systems (where growth in pluggable cars will make loads trickier to juggle over time) and in power electronic systems, crucial to renewables, where the quality of control at kilohertz speeds will have big effects on the bottom line. There is also evidence that the general intelligence of the brain itself is based on RLADP design, such that greater power in RLADP is a path to true quantum Artificial General Intelligence (QAGI). tQuA differs from the older type of quantum annealing, due to Bianchi et al, insofar as it relies on heat flows to a reservoir; noise or error in the equilibrium solution state decreases exponentially with the ratio between the temperature of the reservoir and the energy gap of the desired optimum (which depends of course on the choice of hardware platform, from a list of seven obvious possibilities).

What is an effective, technically viable approach to use and expand quantum computing technology to best address the large emerging needs and opportunities for renewable energy and reduced climate risks?

The larger needs of electric power grids and renewable energy have already been discussed in detail in many venues. Likewise, the need for optimization technology to allow brain-like artificial general intelligence (AGI) is now much more definite, now that we know more about the relation between artificial neural network systems which work in engineering and what we actually see in real-time data from the brain. The purpose of this paper is to provide a roadmap for the next step—the development of a new stream of quantum computing technology which can address these two areas of technology, both of which have many applications. We begin by explaining how this new stream of technology, Quantum Thermal Annealing (tQuA) can expand the capabilities of quantum computing and engineering. We then specify concrete steps to bring it to fulfillment.

This new type of optimization is also well suited to the detection of needles in a haystack," like backdoors in the hardware used in electric power systems, of growing urgent importance to the industry.

In May 2021, Senator Mark Warner, head of the Senate Intelligence Committee announced a set of new national strategic priorities, stressing the central importance of Quantum Information Science and Technology (QuIST). Most of the current US investment in QuIST is based on the technology of Quantum Turing Machines (QTM), invented by David Deutsch, grounded in his theory of the underlying physics. This paper presents a new architecture for quantum computing, tQuA, grounded in a new way to use the same physics, and a roadmap for its development. It promises two major benefits:

(1) Orders of magnitude better performance in applications like optimization and optimal control, compared with the best programs written for QTMs and with highly refined but semiclassical system implemented by D-Wave in collaboration with users who understand the universal general power of optimization systems.

(2) Possibility of Quantum Annealing of Things (QuAth), a whole new family of applications, such as massive improvements in our ability to detect and analyze signals of interest in the night sky, detection of backdoors in computer hardware, computer-assisted drug discovery and robustness of reconfigurable flight control.

This paper explains the basic principles and strategic priorities for tQuA. It provides a three-step plan to develop tQuA, starting from improved quantum quadratic optimization (QQO), leading to improved power in more general nonlinear optimization which can be mapped into quadratic optimization, and which then opens the door to QuAth.

The first step is to prove certain mathematical properties, similar in a way to the decisive early work by Gershenfeld et al of MIT on standard Quantum Turing Machines (QTM). This paper will then discuss five promising hardware platforms to make this work concrete. That in turn can provide a foundation for even greater power, by developing true quantum intelligent systems (QAGI, Quantum Artificial General Intelligence).

In May 2021, Senator Mark Warner, head of the Senate Intelligence Committee announced new national strategic priorities, in his support for the Innovation and Competitiveness Act 2021: "The United States Innovation and Competition Act meets the threat of an increasingly dominant China by significantly investing in the development and manufacturing of technologies that are critical to national security and economic competitiveness. This includes biotechnology, quantum computing, artificial intelligence, and semiconductors—the tiny chips that power modern technology, from cars, computers, and smartphones, to 'smart' devices . . . ."

The United States is now making a massive new investment, expanding its efforts in the type of quantum computing which is rightly called the Quantum Turing Machine (QTM), in honor of David Deutsch of Oxford who rightly won the Fermi award for inventing that whole new paradigm for computing. The QTM is based on a serious, radically realistic theory of how quantum electronics actually works, a theory that works well and has made successful predictions, verified in a huge mass of successful designs and experiments in the field of Quantum Information Science and Technology (QuIST).

Deutsch's theory assumes that we live in a "multiverse", an infinite dimensional space, in which many copies of any object may exist in parallel. These are called "macroscopic Schrodinger cats." Many physicists did not believe that macroscopic Schrodinger cats could actually be created, because they thought that quantum entanglement and mixed states would break down at large distances. However, people implementing Deutsch's ideas, like Gershenfeld of MIT, proved that they can be created and used, just as Deutsch said they could.

Deutsch's key insight was that we can harness the power of massive parallel computing, by driving a massive number of copies of the same physical chip, performing different versions of the same calculation in common. More concretely—if we "split the universe" Q times, we have Q true "qubits". We can perform $2Q$ calculations in parallel. If Q=20 (only twenty qubits, much less than what China's national program in QuIST has already demonstrated), we can "herd about a million $(220)$ Schrodinger cats in parallel."

Deutsch showed us how to create this kind of massive improvement in throughput in the tasks performed by traditional, classical Turing machine computers. However, executing computer programs is not the only general task of importance to technology and the internet. For example, the most powerful modern AI ("the new AI") is based on systems which perform optimization. The D-Wave system performs optimization tasks important to machine learning and other useful tasks in computing, but it does not offer 20 or more true qubits, and does not perform true quantum annealing.

In other words, by using our new QQO design implemented on the same kind of hardware which has entangled more than 20 qubits in QTM systems, Deutsch's physics says we can get speedups on the order of a million or more in applications such as general nonlinear optimization. The same physics also predicts that we can use it in a new level of applications, the Quantum Annealing of Things (QuaTh), which in turn is a step towards true Quantum Artificial General Intelligence (QAGI).

It has taken many years of focused research, exploring multiple parallel approaches, to bring the technology of QTMs up to the level it has reached in the US and China. The full development of tQuA, and of further new technologies it can lead to, will also require many stages. It calls for the development of three whole levels or types of capability:

1. Quadratic Quantum Optimizer
2. General Quantum Optimizer of Computational Systems
3. Quantum Annealing of Things (Optimization of Physical Systems)

These in turn will open the door to further follow-ons. Such as Quantum Artificial General Intelligence (QAGI). We may begin some work on level three even before level one is complete, but systems to operate at levels two and three do require that the hardware developed at level one is available.

1. Design, Test and Development of Quantum Quadratic Optimizer

The task here is to develop the details of a design based on the master equations required for a correct description of dissipation and physical annealing, and then implement it on physical hardware to perform Quantum Quadratic Optimization (QQO) based on tQuA. Quadratic optimization (QO) may be defined as the task of finding the value of a vector u which minimizes the Hamiltonian (see FIG. 1) which we can generalize to the task which we will eventually address (see FIG. 2).

The vector $\underline{u}$ is composed of n complex numbers $u_j$ (as j=1 to n). The overall task is to find the optimal values for these variables, for the problem details specified by the user. The number n is a measure of the size of the QQO, the maximum number of variables which can be optimized. In basic QO, the task is to input matrices $H^0$, $H^I$ and $H^E$ supplied by a user, and find the value of u which minimizes H. The full extended version of this task also allows the user to insert a vector x of exogenous variables, made up of numbers $x_k$ (as k=1 to m).

The design stage is a matter of specifying mathematical details and simulation, analogous to the stage of VLSI design which employs VLSI simulators. The test stage is analogous to the test chips used in VLSI, to prepare for the manufacturing stage.

2. General Quantum Optimizer of Computational Systems

This level will use the QQO system as a component of a larger system to perform computational optimization. In modern artificial intelligence and industrial development, we often see that the real task of economic importance is not just to rewrite a piece of code written for sequential computers (or even develop new algorithms for those computers), but to solve a wide array of optimization problems. These include building a computational system to maximize profits, a control strategy to maximize performance, or a neural network system which minimizes error in prediction or maximizes the performance of a true intelligent learning system. In level two tQuA, we try to harness the full power of quantum superposition to improve performance in this general class of applications.

The Canadian company D-Wave and its partners have developed tools for Quadratic Optimization which may be adapted for use here. These include tools to map general optimization problems, or learning problems, or other customer problems into the present module they have to perform quadratic optimization. And they also have tools to translate the results into useful follow-on products, such as neural networks which may use the optimized value of u to define weights to be used in applications.

Based on the huge need and customer base for this type of product, why did Google abandon its investment and why are current sales so much less than $1 billion per year? (Google and others have expanded much larger investments in Quantum Turing machines, used in the other applications discussed before.)

Existing reviews suggest one core problem: the benefits of D-Wave's existing optimization system, compared with the best available classical systems, are simply not great enough. One can see this even in D-Wave's own customer reviews. For level two tQuA, there is an obvious way forward: pull out the present QO system used by D-Wave, and instead use the QQO design to obtain the massive improvement in throughput which the physics of QuIST says is possible.

3. Quantum Annealing of Things (QuATh)

Level three of tQuA is to demonstrate how quantum entanglement applies to macroscopic physical systems in the real world, not just inside of a computer. Just as the Internet of Things extends global connectivity from programs and data inside computers and internet, to actual controllable physical objects, the Quantum Annealing of Things (QuAth) puts physical objects into states of quantum superposition, in order to optimize physical performance in the physical world.

For example, an effective level two tQuA could be connected to objects like radio telescopes, to improve a million fold the throughput of detection of interesting signals (interesting by the criteria now used at the Breakthrough Institute SETI program) from deep space. Computer chips, biological cells, and even airplanes are also physical objects which can be put into states of quantum superposition.

The basic design for using QuAth in some physical application is shown in FIG. 3. Fundamental Design for QuATh: Quantum Annealing of Things. The tQuA system 301 is connected so as to perform a quantum search over possible choices for the function u(t), running from an initial time t0 at 302 to a final time t' at 304. In this arrangement, it finds the path which maximizes H (t'). To implement this approach, the new requirement is simply to build the Mapper system 303 and the Evaluator system 307, and to connect the boxes!

To optimize the performance or output of a physical plant 305, we usually need to allow some time delay between the time when a new control signal u(t) 304 is received, and the time when the observed output y is ready for evaluation. In this figure, we use the notation "u" to denote the vector of controls used to control the physical plant, as we normally do in control theory. The user gets to decide what range of possibilities should be considered in the optimization; the control mapper 303 is basically a user-defined lookup table to fill in the 2n table of possible choices offered by u0 at 302. The evaluator 307 represents the user's goals, the evaluation score to be maximized. This is connected by y (t') at 306 and H (y(t')) at 308.

As an example, in the SETI application, u would represent settings like promising frequency and direction choices to be used to control an array of radio telescopes. The evaluation would be based on the SETI team's ideas of what kind of signal looks interesting. If the time interval t'-t0 is short, the system could explore millions of settings to find the most interesting signal, for the current exogenous choices, choices which can be changed as the user requests.

A time interval as long as 10 to 20 minutes is also possible, and may be very useful for many purposes. However, we recommend limiting the time for now, and limiting the spatial range of entanglement, in order to avoid possible issues of safety and confusion if entanglement is extended outside the range of the task at hand.

The designs discussed here rely solely on the assumptions made by David Deutsch about the physics of quantum electrodynamics (QED), including the usual assumptions made about quantum measurement (Process 1 according to Von Neumann). However, they may also be of use as a starting point for further research testing alternative theories of quantum measurement and for further internet designs.

Just as today's work on QTM technology has explored many hardware platforms in parallel, some for early stage basic work and some for industrial scale applications to follow, the full development of tQuA should include exploration of at least five basic types of hardware platform, all used in the past with QTMs to demonstrate true quantum superposition (Q> . . . 5, or 20, or 100).

The five which we recommend as priorities for now are:

(1) Nuclear Magnetic Resonance (NMR), "quantum computing in a coffee cup." NMR has not led to practical QTM quantum computers, but the early demonstration by Gershenfeld et al proved that true quantum entanglement and qubits can be achieved in that system. It could be an excellent starting point here as well, demonstrating the new basic mathematics and principles.

(2) true QuA based on quantum optics platforms, which can be used for experiments probing essential properties of quantum measurement important to the more complete theoretical understanding essential to getting full value not only from tQuA but from other quantum technologies.

(3) true QuA based on superconducting qubits (SQuiDS). D-Wave does use a kind of SQuid platform in its box, but it does not have the ability to reject decoherence used in the best modern QTMs, and it does not use the approaches given in which reduce the decoherence problem to much less than what QTMs suffer from.

(4) massive arrays of quantum dots, like what Samsung and LG use in a radical new generation of televisions. New switching needs to be added, but these platforms promise billions of true qubits in systems of only a square meter in size.

(5) high frequency electronic systems, like what is used in the most modern cell phones.

1. How to Combine Quantum and Soft Computing 1.1. Roots of Soft Computing

Lotfi Zadeh proposed soft computing as a new field of research before 1990. He proposed it as a way to unify and extend the emerging fields of fuzzy logic and neural networks, first, and then to unify these with related work in evolutionary computing and other natural allies.

The goal was to build a coalition going beyond the edifice of classical computer science grounded in concepts like Boolean logic, binary variables, digital systems and Turing machines. In his formulation, soft computing aims to develop new general-purpose forms of computing, building beyond the limits of 0/1, black and white thinking, and helping us humans think better about how we can think and reason. The IEEE Computational Intelligence Society was founded by Robert Marks, as another way to unify these same fields, by expanding the IEEE Neural Networks Council and Neural networks Society which he had previously organized.

In 1990, the National Science Foundation followed up with a crosscutting workshop, held at McDonnell-Douglas, working out the details of a new paradigm to unify a soft computing approach, to build true intelligent systems for use in decision and control applications. NSF then followed up with a roadmap for the neural network part of this research, leading up to pathway towards Artificial General Intelligence (AGI) as powerful as that of the mammal brain and for a new way to explain how mammal brains achieve such basic capabilities.

The core of that new paradigm was the development of Reinforcement Learning and Approximate Dynamic Programming, RLADP, a family of methods and designs which can learn to maximize any user-selected utility function over time, by tuning the parameters of a neural network, a set of rules expressed in words using fuzzy logic, or more classic differentiable models such as econometric models. The concept of cardinal utility function and the development of neural networks for artificial intelligence can be traced back to the work of John Von Neumann.

1.2. Roots, Motives and Types of Quantum Information Science and Technology (QuIST)

1.2.1. QuIST Based on David Deutsch and Quantum Turing Machines (QTM)

In 1985, the great Oxford physicist David Deutsch proved how his invention, the universal Quantum Turing Machine (QTM), can perform any computation which a standard Turing machine can perform, but can also perform a more general set.

Some of the computations available to the QTM can be simulated by a conventional Turing machine, but only at a cost which rises exponentially with the complexity of the computation. Such algorithms have been found so far only for a few types of computation; however, after it was learned that these included a quantum algorithm capable of breaking the kinds of codes used at the time in almost all advanced cryptography, the US government launched major research programs across all agencies in Quantum Information Science and Technology (QuIST). Work on advanced communications and communication security related to the QTM technology has also grown in importance.

There is now no doubt that QuIST offers future capabilities of enormous practical importance. For example, Senator MarkWarner, head of the Senate Intelligence Committee, has announced new national strategic priorities, in his support for the Innovation and Competitiveness Act 2021:

"The United States Innovation and Competition Act meets the threat of an increasingly dominant China by significantly investing in the development and manufacturing of technologies that are critical to national security and economic competitiveness. This includes biotechnology, quantum computing, artificial intelligence, and semiconductors—the tiny chips that power modern technology, from cars, computers, and smartphones, to 'smart' devices . . . ".

However, for many important applications, such as optimization, the best QTM algorithms achieve little more than polynomial speedups for all but a few special cases. The overhead cost associated with standard QTMs (e.g., error correction, decoherence issues) has not yet brought the general methods to market.

Just as neural networks can be implemented directly as a hardware architecture, giving power far beyond the simulation of neural networks on Turing machines, based on optimzation concepts such as error minimization and RLADP, quantum annealing hardware can be used directly on optimization problems such as the quantum version of RLADP.

1.2.2. Beyond the QTM: QuIST for Soft Computing

By 2015, Howard Brandt, the great thought leader helping coordinate QuIST programs across US agencies up until his death, had recognized the limits of the QTM and, more important, the huge power available by moving to a different paradigm, beyond 0 s and 1 s to quantum soft computing. For his annual conference on QuIST at SPIE in Baltimore, he invited four teams to present new results based on continuous variables, including us.

In reviewing the prior work, we cited what little relevant prior work we could find in the US. We focused on the challenge of how to combine the universal post-Turing capability of the QTM with another type of post-Turing capability proven for classical neural networks, by Sontag and Siegelmann and others. Intuitively, standard Turing machines offer an aleph-zero countable infinite capability, while Deutsch and Siegelmann and Sontag both offered aleph-one by different pathways. Combining the two offers yet another level of universal capability, aleph-two learning, which could be extended even further by exploiting new measurement components and models for which preliminary results are encouraging but yet to be fully implemented. We proposed a pathway to build true Quantum Artificial General Intelligence (QAGI), step by step. This paper will describe more concretely what steps come next on that path.

In 2015, the most relevant work in actual operation in quantum soft computing was work by the company D-Wave. Instead of trying to build an improved sequential computer designed for bits or qubits, D-Wave built a general purpose working commercial system aimed at solving a very broad class of optimization problems. Almost all higher order problems in AGI or in profit maximization or in prediction map naturally into optimization problems (including optimization over continuous variables, not only binary), which the D-Wave system was constructed to handle. Apolloni et al. showed that D-Wave system can outperform many classical optimization algorithms, such as classical thermal annealing methods.

Unfortunately, the existing D-Wave system relies heavily on a component which we call an orbital quadratic optimizer (OQO), which has limited the range of optimization problems which they can perform well on. Their system includes:

the OQO, plus an important set of attached capabilities which can map any static optimization problem (to minimize $F(u)$ for some vector u which may be real or complex) into problems which the OQO can handle, plus important interfaces to applications.

This paper will discuss how to design and build a true quantum quadratic optimizer (tQQO), by directly exploiting the physics vision of David Deutsch and the physics of true annealing well-known in condensed matter physics. The development of tQQO, from mathematics to simulation to hardware, is the crucial first step in the roadmap to QAGI.

In the next step, the QQO could be inserted directly into D-Wave or any new system like D-Wave, to expand its power. Finally, this paper will also discuss a way to apply this technology to optimize actual physical plants, like radio telescopes and chip diagnostics, through an approach we call the Quantum Annealing of Things. Just as the Quantum Turing Machine can perform some tasks with an exponential advantage over the classical Turing machine, because of the physics it harness, Thermal Quantum Annealing (tQuA) offers similar advantages over classical thermal annealing and other classical optimization methods.

2. Design and Path to a True Quantum Quadratic Optimizer 2.1. Key Underlying Principles The true QQO is firmly grounded in the same physics that David Deutsch used when he first envisioned the QTM. That same physics has continued to ft reality in very extensive work performed on QTMs in recent years.

Deutsch actually began with a theory of how physics actually works. That theory postulates that we actually live in a "multiverse," in which computer chips, cats and other macroscopic objects can be put into a state of quantum superposition. Some of us seriously doubt whether there could be multiple copies of us humans out there, existing in parallel, but the empirical evidence is now overwhelming that we can put objects like computer chips and long-distance communication channels into a state of quantum superposition.

Intuitively, then, a QTM with 20 true "qubits" creates $2^{**}20$ parallel copies of the same device, performing variations of the same computation—"herding a million Schrodinger cats." QTMs have been built and proven to work with far more than 20 qubits.

Our concept of QQO is to build a new type of u-box, in which millions of Schrodinger cats really are run in parallel to search through millions of possible values for the vector u, and settle down on the one which minimizes a figure of merit $E(u)$. In our concept, the u box is coupled to a reservoir, an external environment or bath of some kind, which we simply need not model in any detail in the beginning, as we design and test the first true QQO. The figure of merit E is represented by the standard H energy for the system defined by u (accounting for exogenous inputs x if desired). The natural energy level (temperature) of the reservoir must be less than the minimum value of E. The idea is that excess energy of E, above its minimum value, can be shed by ordinary dissipation to the reservoir. The reservoir will of course send noise back to the u box, but if the resulting quantum noise is small enough the thermal equilibrium in the u box should be close enough to the true global minimum in many important applications. (Not all applications, but we will give examples of some important ones.)

Note that there is no need for a final stage of selecting which cat we want, or of defuzzification. The choice of a good u is performed by the same thermodynamics operating from the moment when the full system is turned on. The choice of initial state should not matter so much as it would with a QTM. More precisely, to achieve a stochastic search exploiting "a million Schrodinger cats all working in parallel," one may either initialize the system in a rich mixed state over possible values of u(0), or one may start with a strong coupling (C(t)) between the core and the reservoir, reduced to 0 over timr, as in true annealing as used in solid state physics or materials science.

The standard OQO design (Appolloni 1988) aims to minimize E, by varying a different coupling constant in the Hamiltonian, representing the strength of interactions within the core itself, and orbiting around the set of possible states in hope of finding a breakthrough to a better state through quantum tunneling. Dissipation has been observed in that u box in actuality, but is not integrated into the design or the mode of operation.

The first step in specifying the QQO is to specify the final figure of merit, E=H, which it will minimize. The OQO minimizes a slightly simpler target, shown in FIG. 1.

As we consider the full range of applications, we would specify a slightly more general target, as shown in FIG. 2.

The vector u is composed of n complex numbers $u_j$ (as j=1 to n). The overall task is to find the optimal values for these variables, for the problem details specified by the user. The number n is a measure of the size of the QQO, the maximum number of variables which can be optimized. In OQO, the task is to input matrices H0, HI and HE supplied by a user, and find the value of u which minimizes H. The full QQO version of this task also allows the user to insert a vector x of exogenous variables, made up of numbers $x_k$ (as k=1 to m).

2.3. Model of the Reservoir for Initial QQO Simulation and Design

A rigorous mathematical model of such a system when coupled to a stochastic reservoir would call for a master equation for the dynamics of the density matrix of the system, using the kinds of mathematical tools described in detail by Carmichael and Walls and Milburn. However, for purposes of initial simulation and design, using a small number of variables to test the basic principles and performance versus OQO, it should be sufficient to simulate the system on an ordinary, sequential computer, A proper simulation system should combine both ways of representing the uncertainty in u(t) over time t: (1) trajectory simulations, starting from a state u but adding a noise factor, a jump stochastic process receiving or sending energy from the u box, under control of parameters to be set by the user running the simulation; (2) an estimated density matrix or simulated wave function, covering the space of possibilities with low resolution, such as a grid with spacing 0.1 or 0.2 (user selected), representing the same.

A natural noise model would be a stochastic choice, to be made at small intervals of time $\Delta t$. In each time interval, a j between 1 and n is chosen. Two possible jumps are considered: a jump up (noise), where $u_j$ is multiplied by 1+delta, and a jump down (dissipation), where it is divided by 1+delta. The probability of a jump would be calculated based on the change in the total energy E (as given in Eq. (1)), the usual Boltzmann equation, the assumed temperature Hr of the reservoir (a fixed parameter in initial simulations). The user would naturally want to consider values representing the kind of noise levels which might be expected from some of the available types of platforms available for implementing the qubits and the reservoir.

It should not be difficult to translate this kind of model to a full master equation model, in the limit of small time intervals, but for now the first stage is to explore interesting possible values for H and for noise parameters, compared to D-Wave results. Simulations on a classical digital computer should be enough to demonstrate the advantages of thermal quantum annealing on relatively small but interesting test problems. Before the actual construction of physical prototypes, it might be advantageous to perform a true quantum simulation of the design on larger test problems.

For an exact model of the tQQO kind of system, connecting a core and a reservoir across choices of Hamiltonian H and coupling to reservoir, one must analyze the properties of the grand canonical Boltzmann density operator or, if one believes a more neoclassical model of the physics, the entropy function for that class of problem. In either case, choices of H and coupling which imply millions of local minima in the error or entropy surface should be tractable with a tQQO design which makes effective use of millions of Schrodinger cats in parallel, which the present D-Wave system does not.

For a later, more complicated phase of simulations and mathematical analysis, success is guaranteed more with stochastic simulations which reflect the grand canonical density matrix or neoclassical entropy function. These would be based on perturbations of the entire vector u. We need to fix a procedure which, depending on u and on global simulation parameters to be set by the user, determines Pr(u*|u(t)), the probability that our program chooses the value u* out of all the values available in the complex surface Cn. In essence, the problem of selecting (programming) this probability distribution for use in these.

As Tv goes to zero, the obvious simulation approach here is to assume that u will be perturbed towards a value of minimum energy, simply by choosing a probability of u being changed to u* with follows a Boltzmann distribution, exp (–k(H–H*)/C(t)), normalized across possible values of u* such that the integral of Pr(u*|u(t)) over u*=1, with k a user-selected simulation parameter.

2.4. Test Problems of Interest

Even when D-Wave is compared with classical or QTM optimizers, we have learned, as expected, that different systems do better on different types of problems. The first major goal here is to identify at least one interesting class of problems for which we expect better performance than with the OQO, and for which genuinely interesting application seem likely.

For this purpose, we recommend study of "needle in a haystack" kinds of problems. We define these as problems where H is chosen to make the space of possible values of u relatively flat, but lowered by thousand or millions of "haystacks", small regions (like Gaussians) of diverse depth and other parameters. For a true QQO, with well chosen parameters, it would operate like a herd of millions of cats, scattered all over feld, exploring different places, with only the best cat(s) dominating the thermodynamic equilibrium. There is no orbiting or quantum tunneling required. Given what has been observed with D-Wave on systems with local minima, we strongly expect a large family of examples to exist which can represent this kind of benefit. The world of applications contains many such needle in a haystack application. Two which we consider most interesting are "SETI" and "chip diagnostics".

In SETI, we are often confronted with the problem of how to find signals which meet some concept of a needle in a haystack. In a gigantic database, with computer controlled addressing, the challenge is to find those signals which score highest in some quantitative measure of what kind of signal has the best chance of representing extraterrestrial intelligence of some kind. Recent results from this very serious research have been reported in Scientific American and cry out for much more thorough and complete investigation of the underlying databases. In a similar fashion, chip diagnostics call for more comprehensive, faster searches of computer chips, for which measures of undesired or dysfunctional behavior are often available. (We think of this application as "quantum bromium").

Simple, abstract demonstrations of the advantages would of course be an important step towards physical prototypes and exploration on a larger scale.

2.5. Hardware Platforms of Interest

The first step in going from proof of principle in simulation to actual design evaluation is to evaluate possible hardware platforms, and extract what ranges of parameters might be implemented in prototype.

Current research on QTMs explores dozens of possible hardware platforms, but here it would make sense to limit early exploration to five possibilities, when and as opportunities arise:

(1) Nuclear Magnetic Resonance (NMR), "quantum computing in a coffee cup." NMR has not led to practical QTM quantum computers, but the early demonstration by Gershenfeld and Chuang proved that true quantum entanglement and qubits can be achieved in that system. It could be an excellent starting point here as well, demonstrating the new basic mathematics and principles.

(2) Simple quantum optics platforms, which can be used for experiments probing essential properties of quantum measurement important to the more complete theoretical understanding essential to getting full value not only from QQO but from other quantum technologies.

(3) Superconducting qubits (SQuiDS). Squids have been widely used at D-Wave, at NSA and in China. However, it is not clear whether they have the best choice of parameters available for QQO.

(4) Massive arrays of quantum dots, like what Samsung and LG use in a radical new generation of televisions. New switching needs to be added, but these platforms promise billions of true qubits in systems of only a square meter in size.

(5) High frequency electronic systems, like what is used in the most modern cell phones. This may allow the kind of additional flexibility needed for the more advanced technologies beyond even Quantum Annealing of Things (QuATh).

Because temperature parameters are so important to the performance of systems of this type, it is also possible that the new system described in Spivey et al. could allow for better performance in many crucial applications.

3. Quantum Annealing of Things (QuATh)

Once the benefits of QQO have been demonstrated, we will be ready to explore a few of the many applications possible in a whole new area which we call the Quantum Annealing of Things.

QuATh aims to demonstrate how quantum entanglement applies to macroscopic physical systems in the real world, not just inside of a computer. Just as the Internet of Things extends global connectivity from programs and data inside computers and internet, to actual controllable physical objects, the Quantum Annealing of Things (QuAth) puts physical objects into states of quantum superposition, in order to optimize physical performance in the physical world.

For example, an effective QQO-based optimizer could be connected to objects like radio telescopes (not just their databases), to improve a million fold the throughput of detection of interesting signals from deep space. Computer chips, biological cells, and even airplanes are also physical objects which can be put into states of quantum superposition.

The basic design for using QuATh in some physical application is shown in FIG. 3.

To optimize the performance or output of a physical plant, we usually need to allow some time delay between the time when a new control signal u(t) is received, and the time when the observed output y is ready for evaluation. In this slide, we use the notation "u" to denote the vector of controls used to control the physical plant, as we normally do in control theory. The user gets to decide what range of possibilities should be considered in the optimization; the "control mapper" is basically a user-defined lookup table to fill in the 2n table of possible choices offered by $u_o$. The evaluator represents the user's goals, the evaluation score to be maximized.

As an example, in the SETI application, u would represent settings like promising frequency and direction choices to be used to control an array of radio telescopes. The evaluation would be based on the SETI team's ideas of what kind of signal looks interesting. If the time interval t'-t0 is short, the system could explore millions of settings to find the most interesting signal, for the current exogenous choices, choices which can be changed as the user requests.

A time interval as long as 10 to 20 min is also possible and may be very useful for many purposes. However, we recommend limiting the time for now, and limiting the spatial range of entanglement, in order to avoid possible issues of safety and confusion if entanglement is extended outside the range of the task at hand.

The underlying mathematics of optimization change substantially when we progress from minimizing a fixed static function f(u) to minimizing the end result of a dynamical system. The obvious way to do this would be use this kind of optimizer to implement the components of existing general RLADP designs. Because RLADP is a pathway to build true artificial general intelligence, this enhancement of RLADP would be a direct pathway to true Quantum Artificial General Intelligence (QAGI).

Nevertheless, when we manipulate information over time in this way, we should remember that there is a possibility that the fundamental principles of quantum electrodynamics may not follow exactly the physics assumed by David Deutsch. New experimental realms may bring out new physics and require new experiments. Correct models for quantum dots and for advanced transistors operating beyond 100 GHZ, entailing phenomena like collapse or splitting of wave functions, might be different in nature for different components, leading to different options in technology.

4. In conclusion: From Quantum Soft Computing to Sustainable Intelligent Internet The development of QAGI based on RLADP concepts will be a monumental long-term goal in itself, offering a unified focus to many technical areas which need to be integrated. However, as with classical RLADP, there will be larger societal implications which also need to be considered, especially in the design of larger internet systems using these capabilities. If the future global internet of things (IOT) were organized so as to control everything on earth to maximize one centrally defined utility function U, it would not live up to the highest values and capabilities of the human beings living in that system, unless there are major parallel research efforts to account for those values and capabilities from the start. That is true even in the classical domain.

These parallel research efforts should take advantage of efforts to design not only computer systems but markets, to account more fully for the situation where the utility functions of many players must be considered. In complex multiplayer systems, step-by-step progress towards Pareto optimal systems can require a high level of understanding and focus by the humans who build such designs, and the risks of accepting Nash equilibria can be literally fatal. The development of a Sustainable Intelligent Internet (SII) requires the development of technologies like RLADP and QAGI, but also requires larger scale systems development which can take positive advantage of them.

The three step roadmap presented here assumes, again, the validity of Deutsch (1997) and Chaiken et al. (1995) as models of the underlying physics. As we develop ever more powerful systems, it is possible that new experiments and mathematics will point to new technology options which extend this road even further.

1. First stage tQuA, a new type of quantum quadratic optimizer (tQQO) which solves quadratic optimization problems like what the core of D-wave does, but with a way to mobilize far more "Schrodinger cats" in parallel, far more computational explorations, which in some applications may yield thousands of times more computational power than the old method. Also a pathway to demonstrate this on "needle in a haystack" example problems, to be simulated with simulation of suitable quantum hardware.

2. Second stage tQuA, embedding tQQO into a more general nonlinear optimization package, combining the standard kinds of interfaces already in use at D-Wave, but augmented by used of the Reinforcement Learning and Approximate Dynamic Programming (RLADP) methods for optimization across time, previously patented by Werbos but to be extended here to exploit the tQQO kernel. Among the anticipated test examples is the use of tQuA to expand the power of astronomical imaging, a needle in a haystack problem described in Hyland, David C. "Analysis of noise-reducing phase retrieval." Applied Optics 55, no. 13 (2016): 3493-3501. This example is a steppingstone hoped to lead to massive improvement in the capabilities of finding terrestrial planets in the sky (the TPF, Terrestrial Planet Finder mission).

3. QuAThe, the third stage of tQuA, suitable for tasks like optimal control of radio telescopes and constellation image systems, to control actual frequency and direction settings so as to maximize the frequency of finding desired "needles in a haystack" in the sky, for applications such as SETI (Search for ExtraTerrestrial Intelligence).

In all cases, minimization problems are simply inverted maximization problems. As such, maximization problems are covered by this invention.

Figure 4:
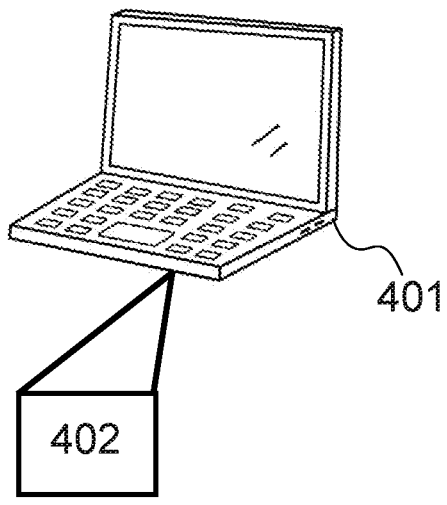
FIG. 4 is a block diagram showing a computational device with computer program product.

FIG. 4 is a block diagram showing a computational device with computer program product that may be used in one embodiment of the present invention. The computational device 401 has a plurality of tQQO devices 402 inside (see FIG. 5 for an example). A computer program product resides in the computational device 401 in computer storage medium and uses a computer storage medium configured to run the computer program product and utilize the tQQO devices 402 to solve mathematical problems.

Figure 5:
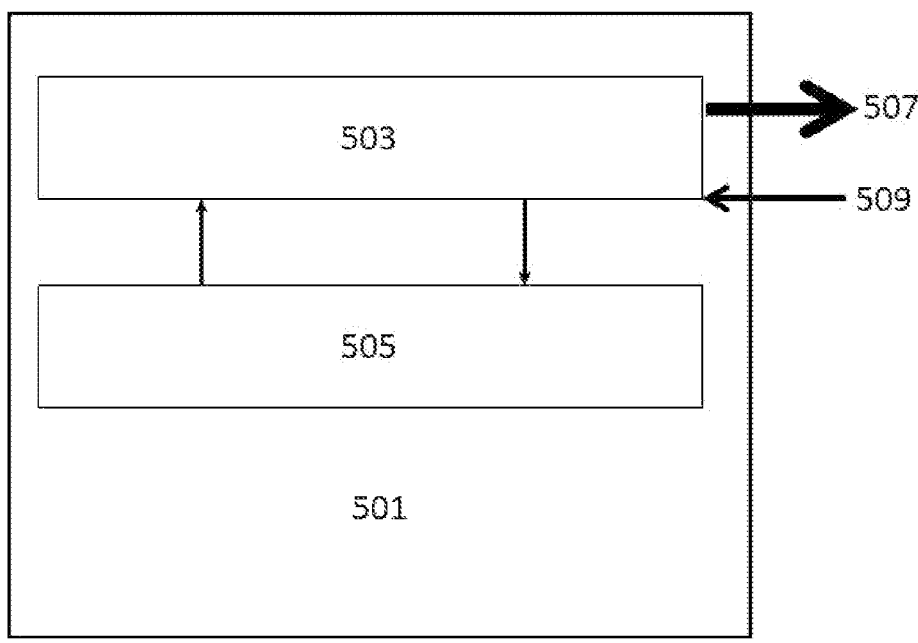
FIG. 5 is a block diagram showing a tQQO device.

FIG. 5 is a block diagram showing a tQQO device that may be used in one embodiment of the present invention. The tQQO device 501 consists of a heat reservoir 505 and an Ising type quantum array 503. The Ising type quantum array 503 is described by {u j j=I to N} flux qubits. Exogenous inputs x are input at 509. Communication between the heat reservoir 505 and the Ising type quantum array 503 is described previously in this disclosure. A U* optimizing solution 507 comes from the Ising type quantum array 503.

In some embodiments, the Ising type quantum array is in physical contact with the heat reservoir such that excess heat from the Ising type quantum array dissipates to the heat reservoir. In some embodiments, the tQQO device is configured to conduct true quantum annealing calculations.

In some embodiments, a system for solving mathematical problems includes a computer program product configured to use one or more of the tQQO devices of FIG. 5. A computer storage medium and a computer program code mechanism embedded in the computer storage medium are configured to run the computer program product and cause the computer to solve the mathematical problems.

In some embodiments, the mathematical problems are QAGI problems. These can include needle in a haystack problems, error functions in a pocked landscape, and maximization or minimization of non-linear function of N inputs with or without constraints, a universal learning system that predicts, simulates, or conducts state estimations. This can enable solutions of RLADP structures by QAGI.

In some embodiments, the computer program product uses the one or more tQQO devices by specifying and minimizing the final figure of merit.

In some embodiments, the computer program product is configured to control an electric power grid.

In one embodiment, a system for controlling a situation in the real world with quantum mechanics is provided. A computer program product is configured to use one or more of the tQQO devices of FIG. 5. The computer program product is further configured to build a direct quantum controller simulating solutions to problem states by entangling the problem states with the heat reservoir. The computer program product is further configured to select among the problem states of the situation for a desirable outcome to the situation.

In one embodiment, the situation is controlling a macroscopic Schrodinger cat scenario and the problem states are a state of being alive and a state of being dead and the computer program product selects the desired state.

In one embodiment, the situation is controlling an airplane landing and the problem states are a state of landing and a state of crashing and the computer program product selects the state of landing.

In one embodiment, the situation is controlling a transistor in power electronics and the problem states are a state of higher power and a state of lower power and the computer program product selects a desired state.

In one embodiment, the situation comprises controlling an observation device to achieve higher resolution of objects at a distance. The observation device may be as simple as a telescope or as complex as an axion detector system.

In one embodiment, the computer program product calculates a position of the airplane a chosen amount of time into the future and chooses a course for the airplane to maximize a likelihood of the successful landing.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

The invention claimed is:

1. A method for solving continuous-variable quantum quadratic optimization problems, comprising:
   coupling entangled qubits encoded with an Ising model problem to a heat reservoir;
   wherein the Ising model problem expresses a continuous-variable quantum quadratic optimization problem;
   evolving the entangled qubits by thermal annealing, resulting in optimized solutions to the continuous-variable quantum quadratic optimization problem; and
   varying a temperature of the heat reservoir on a schedule such that each evolution of the entangled qubits occurs while the heat reservoir is at a desired temperature.

2. The method of claim 1, wherein evolving the entangled qubits by thermal annealing occurs by heat dissipation from the entangled qubits to the heat reservoir.

3. The method of claim 2, wherein the entangled qubits are at a higher temperature than the heat reservoir.

4. The method of claim 2, further comprising decreasing noise in the optimized solutions by increasing a ratio between a temperature of the heat reservoir and an energy gap of a desired optimum.

\* \* \* \* \*